April 23, 1963  A. D. GOETTL  3,086,342
COMBINATION EVAPORATIVE COOLER AND CARBON FILTERING MEANS
Filed May 10, 1960  2 Sheets-Sheet 1

INVENTOR.
ADAM D. GOETTL
BY
PATENT AGENT

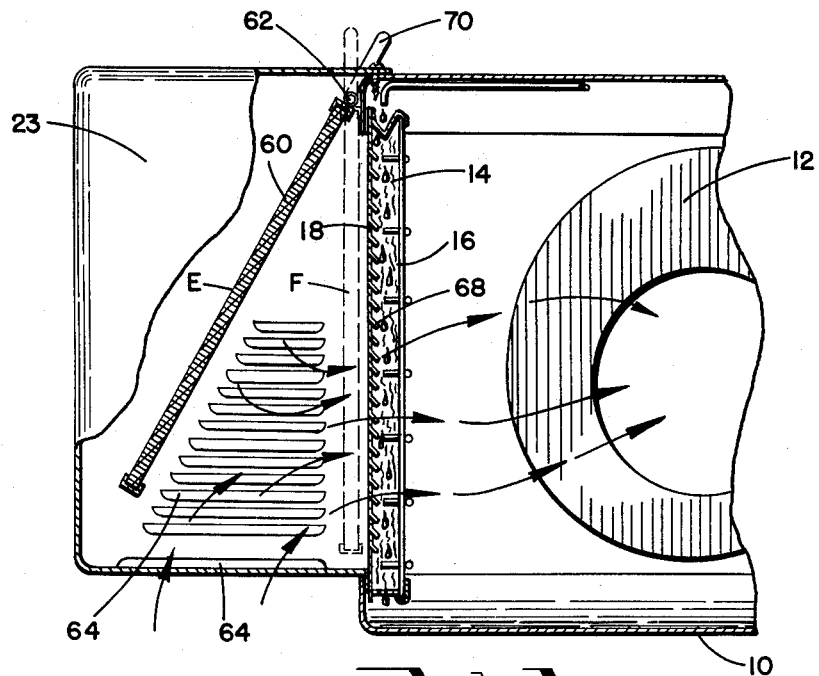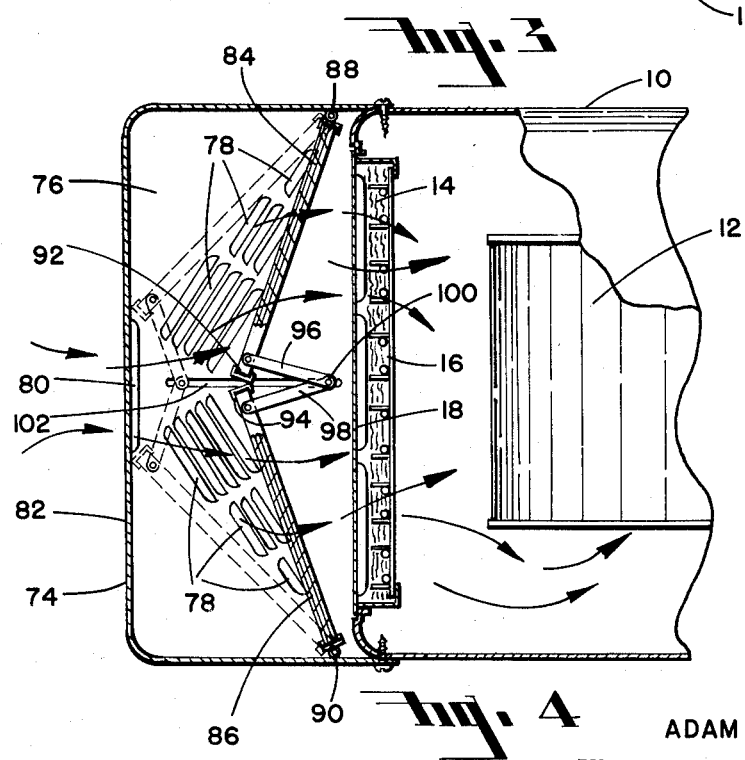

United States Patent Office 3,086,342
Patented Apr. 23, 1963

3,086,342
COMBINATION EVAPORATIVE COOLER AND
CARBON FILTERING MEANS
Adam D. Goettl, Phoenix, Ariz., assignor to McGraw-Edison Company, Milwaukee, Wis., a corporation of Delaware
Filed May 10, 1960, Ser. No. 28,130
4 Claims. (Cl. 55—316)

This invention relates to a combination evaporative cooler and carbon filtering means and more particularly to a combination evaporative cooler and carbon filtering means wherein a carbon filtering element is movably disposed at the inlet of an evaporative cooler, whereby it filters air entering the evaporative cooler pads of the cooler and may be moved out of the path of air entering the evaporative cooler pads to reduce air flow restriction when the carbon filter is not in use.

The combination of carbon filters disposed at the inlets of evaporative cooler pads is well known and it has been recognized that such carbon filters restrict the flow of an evaporative cooler which may be required to deliver cool air only during certain periods and may alternately be required to filter out various odors and other deleterious gaseous matter carried in the air entering the evaporative cooler.

Accordingly, it is an object of the present invention to provide a combination evaporative cooler and carbon filtering means which employs a movable carbon filter in the path of air moving toward an evaporative cooler pad whereby movement of the carbon filter permits full flow of air through the evaporative cooler pad.

Another object of the invention is to provide a novel inlet housing containing pivoted carbon filtering elements adjacent the inlet of the evaporative cooler pad of an evaporative cooler whereby the carbon filtering elements may be quickly and easily pivoted out of the path of air flowing to the inlet of the evaporative cooler to thereby permit a full volume flow operation of the evaporative cooler when the carbon filtering action is not required.

Another object of the invention is to provide a novel means for connecting and sealing between a pair of pivoted carbon filters disposed adjacent each other.

A further object of the invention is to provide an evaporative cooler having an inlet housing containing a pivoted carbon filter movable into and out of the path of air entering the evaporative cooler pad and which is operable by means externally of the evaporative cooler housing.

Further objects and advantages of the invention may be apparent from the following specification, appended claims, and accompanying drawings, in which:

FIG. 3 is a plan sectional view, similar to FIG. 1, showing a modified form of the invention; and FIG. 4 is another plan sectional view similar to FIG. 1 showing a further modified form of the invention.

Figures 1, 2:
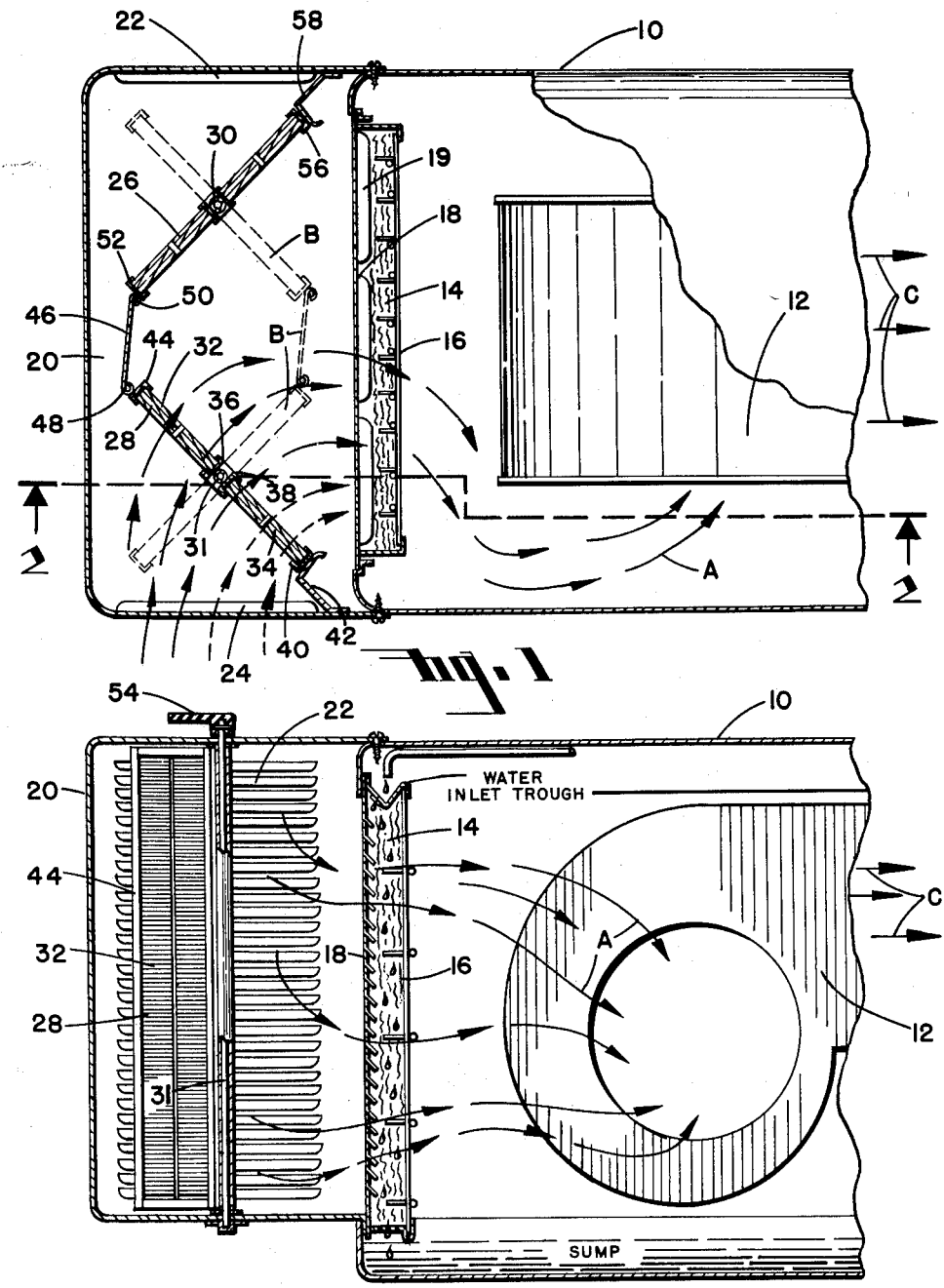
FIG. 1 is a fragmentary sectional view of a combination evaporative cooler and carbon filtering means in accordance with the present invention.
FIG. 2 is a vertical fragmentary sectional view taken from the line 2—2 of FIG. 1.

As shown in FIG. 1 of the drawings, a conventional evaporative cooler housing 10 is provided with a blower 12, therein, which forces air through a conventional evaporative cooler pad 15 in the direction of the arrows A. Thus, the pad 14 is provided with an outlet side 16 adjacent to the blower 12 and an inlet side 18 having contiguous louvers 19 which face the interior of a carbon filter housing 20 having inlet louvers 22 and 24 in the side walls thereof. These louvers 22 and 24 are conventional punched out louvers to provide air flow communication between the interior and exterior housing 20.

Pivotally mounted in the housing 20 are a pair of carbon filters 26 and 28. These carbon filters 26 and 28 are provided with axles 30 and 31 about which these carbon filters 26 and 28, respectively, are pivotally mounted. Each of the filters 26 and 28 is composed of two sections. Therefore, the filter 28 will be described in detail. This filter 28 is provided with a section 32 and another section 34; the section 32 having a channel 36 coupled to the axle 31 while the filter element 34 is provided with a channel 38 coupled to the opposite side of the axle 31. The opposite edge of the filtering element 34 is provided with another channel 40 which is adapted to contact a resilient seal member 42 as will be hereinafter described in detail.

The filtering element 32, at its opposite edge from the channel 36, is provided with a channel 44 to which is pivotally connected a baffle 46. This baffle is pivoted on a pin 48 coupled to the channel 44 and the opposite edge of the baffle 46 is pivoted by means of a pin 50 to a channel 52 of the carbon filter 26.

The channel 52 is similar to the channel 44 of the carbon filter 28.

Coupled to the axle 31, externally of the housing 20, is a lever 54 which is disposed remotely to pivot the carbon filter 28 about the axis of the axle 31 while the baffle 46, being pivotally connected by means of the pins 48 and 50 with the carbon filter 26, causes it to pivot about the axle 30.

It will be seen that the carbon filters 26 and 28, together with the baffle 46, may be pivoted to a broken line position or may remain in a solid line position, as shown in FIG. 1 of the drawings.

When the carbon filters 26 and 28 are in the solid line position, the channel 40 of the carbon filter 28, contacts a resilient seal member 42 while a similar channel 56 of the carbon filter 26 contacts a seal member 58. In this position, air passes through the louvers 22 and 24, carbon filters 26 and 28, to the inlet side 18 of the evaporative cooler pad 14, whereby the air is forced on through the louvers 19, evaporative cooler pad 14 and into the centrifugal blower 12 which delivers the air to a use location.

During the use of the carbon filters 26 and 28, odors and other gaseous impurities are removed from the air before it passes into the evaporative cooler pad wherein evaporation takes place and cools the air to a lower temperature.

When the carbon filtering pads 26 and 28 are moved to the broken line position B, air passing inwardly through the louvers 22 and 24 bypasses these carbon filters and flows directly through the louvers 19 and the evaporative cooler pad 14, whereby the restriction and/or pressure drop across the carbon filtering pads 28 is reduced in order to provide unrestricted flow of air to the louvers 19 at the inlet side 18 of the evaporative cooler pad 14, thereby permitting the blower 12 to deliver a greater volume of evaporatively cooler air.

It will be understood that the baffle 46, when in either the solid line position or the broken line position, shown in FIG. 1 of the drawings, prevents leakage between the pivoted carbon filtering pads 26 and 28 and due to the angular dispositions of these pads 26 and 28, when in the solid line position, they are capable of providing considerable flow area.

In operation of the combination evaporative cooler and carbon filtering means of the present invention, the evaporative cooler delivers cool air, which may be odorless, if desired, by utilization of the carbon filtering pads 26 and 28 in the solid line position, shown in FIG. 1 of the drawings. These pads, when utilized to filter the air upstream of evaporative cooler pad 14, remove various gaseous impurities and odors as well as other deleterious matter which might have harmful effects if delivered in the airstream passing from the blower 12, as indicated by arrows C in FIG. 2 of the drawings.

At certain times when the air is not laden with odors, gases, or other deleterious matter, the filters 26 and 28 may be moved to the broken line positions to permit unrestricted flow of air to the evaporative cooler pad 14, which permits the blower 12 to deliver a greater volume of evaporatively cooled air.

In the modification, as shown in FIG. 3 of the drawings, the blower 12 is positioned downstream of and adjacent the outlet side 16 of the evaporative cooler pad 14 whose inlet side 18 communicates with the interior of carbon filter housing 22, wherein a carbon filter 60 is pivotally mounted on an axle 62 and is disposed to swing diagonally in the housing 22 from a solid line position E to a broken line position F.

These louvers 64 are punched in the side walls of the carbon filter housing 22 and when the carbon filtering pad 60 is in the solid line position E, unrestricted flow of air may pass through the louvers 64 and through louvers 68 adjacent the inlet side 18 of the evaporative cooler pad 14. When carbon filter is in the broken line position F, air must pass therethrough before entering the pad 14.

In FIG. 4, a further modification of the invention is shown and this figure is a plan sectional view looking at the top of the cooler. A modified inlet housing 74 of the modification shown in FIG. 4 is provided with a top 76 wherein louvers 78 are disposed. Additionally, louvers 80 are formed in a vertical side 82 of the housing 74.

The louvers 78 are disposed in a substantially obtuse V shaped pattern to coincide with angular positions of carbon filtering pads 84 and 86, which are pivoted, respectively, on bearings 88 and 90 stationarily located in the housing 74.

Pivotally connected to the free ends 92 and 94 of the carbon filtering pads 84 and 86, respectively, are links 96 and 98, the opposite ends of which are pivotally connected by an actuator pin 100 which extends through a slot 102 in the top 76. The actuator pin 100, when moved in the slot 102, causes pivotal actuation of the carbon filtering pads 84 and 86, together with the links 96 and 98, to the broken line positions shown in FIG. 4 of the drawings. It will be seen that when the carbon filtering pads 84 and 86 are moved to the broken line positions, that the carbon filtering pads are outwardly of the louvers 78 and that the louvers 80 communicate between the free ends of the carbon filtered pads 84 and 86, whereby air flows, without restriction, to the evaporative cooler pad 14.

It will be further seen that when the carbon filtering pads 84 and 86 are in the sold line positions shown in FIG. 4, that the free ends 92 and 94 of these pads are engaged together and they are inwardly of the louvers 78 whereby air must flow from the louvers 78 and 80 through the carbon filtering pads 84 and 86 before entering evaporative cooler pad 14.

It will be obvious to those skilled in the art that various modifications of the present invention may be resorted to in a manner limited only by a just interpretation of the following claims.

I claim:

1. In a combination evaporative cooler and carbon filtering means the combination of: an evaporative cooler housing having an evaporative cooler pad therein; said pad having an inlet side and an outlet side; means for forcing air through said pad from its inlet side to its outlet side; said housing having air inlet louvers communicating with the inlet side of said evaporative cooler pad; and a pair of carbon filtering pads pivotally mounted adjacent the inlet side of said evaporative cooler pad, said carbon filtering pads mounted on axes near the middle portions thereof and having first free ends adjacent each other; a baffle pivotally interconnecting said first free ends of said carbon filtering pads to provide an air seal therebetween, said carbon filtering pads having second free ends opposite to said first free ends and means in said housing adjacent each of said second free ends of said carbon filtering pads forming a contact seal whereby, air, entering said louvers must pass through said carbon filtering pads on its way to the inlet of said evaporative cooler pad and whereby pivotal movement of said carbon filtering pads shifts them, at said second free ends, out of interference with air passing from said louvers to the inlet side of said evaporative cooler pad.

2. In a combination evaporative cooler and carbon filtering means the combination of: an evaporative cooling housing having an evaporative cooler pad therein; means for forcing air through said pad; a pair of carbon filtering elements adjacent the inlet of said evaporative cooler pad each of said carbon filtering elements having one edge thereof pivoted in said housing; the opposite ends of said pads disposed to swing together into contiguous relationship to each other to form a restriction communicating with the inlet of said evaporative cooler pad, whereby air entering the same must flow through said carbon filtering elements; said housing having louvers disposed in communicative relation with the inlet sides of said carbon filtering elements when their free ends are disposed in contiguous relationship to each other; said louvers disposed in such position that when the filtering elements are pivoted outwardly from said evaporative cooler pad at their free ends, that said carbon filtering elements are disposed outwardly of said louvers and they communicate between said carbon filtering elements and said evaporative cooler pad to thereby permit air to flow directly to the evaporative cooler pad without passing through the carbon filtering elements.

3. In a combination evaporative cooler and carbon filtering means the combination of: an evaporative cooler housing having an evaporative cooler pad; therein; means for forcing air through said pad; a pair of carbon filtering elements adjacent the inlet of said evaporative cooler pad, each of said carbon filtering elements having one edge thereof pivoted in said housing; the opposite ends of said pads disposed to swing together into contiguous relationship to each other to form a restriction communicating with the inlet of said evaporative cooler pad, whereby air entering the same must flow through said carbon filtering elements; said housing having louvers disposed in communicative relation with the inlet sides of said carbon filtering elements when their free ends are disposed in contiguous relationship to each other; said louvers disposed in such position that when the filtering elements are pivoted outwardly from said evaporative cooler pad at their ends, that said carbon filtering elements are disposed outwardly of said louvers and they communicate between said carbon filtering elements and said evaporative cooler pad to thereby permit air to flow directly to the evaporative cooler pad without passing through the carbon filtering elements; links connected to the free ends of said carbon filtering elements and having a common actuating member; said housing having a slot through which said common actuating member extends whereby the free ends of said carbon filtering elements may be pivoted apart by movement of the actuator member through the slot and longitudinally thereof relative to said housing.

4. In a combination evaporative cooler and carbon filtering means the combination of: an evaporative cooler housing having an evaporative cooler pad therein; means for forcing air through said pad; a carbon filtering element adjacent the inlet of said evaporative cooler pad, said carbon filtering element having one edge thereof pivoted in said housing; an opposite free edge of said pad disposed to swing in an arcuate path in said housing outwardly of said evaporative cooler pad; said housing having louvers disposed in communicative relation with the inlet side of said carbon filtering element when its free edge is disposed in one position near said evaporative cooler pad; said louvers disposed in such position that when said filtering element is pivoted outwardly away from said evaporative cooler pad at its free edge that said carbon filtering element is disposed outwardly of said louvers and said louvers communicate between said carbon filtering element and said evaporative cooler pad to thereby permit air to flow directly to said evaporative cooler pad without passing through said carbon filtering element.

References Cited in the file of this patent

UNITED STATES PATENTS

| | | |
|---|---|---|
| 684,692 | Jarvis | Oct. 15, 1901 |
| 951,819 | Lair et al. | Mar. 15, 1910 |
| 2,146,071 | Horvath | Feb. 7, 1939 |
| 2,205,831 | Hartman | June 25, 1940 |
| 2,926,747 | Wright et al. | Mar. 1, 1960 |